May 17, 1966  R. H. POPPER ETAL  3,251,251
GRIPPING TOOL PROVIDED WITH MEANS AUTOMATICALLY ADJUSTING THE
SIZE OF THE CLAMPING MOUTH IN CORRESPONDENCE WITH THE
CONFIGURATION OF A WORKPIECE TO BE GRIPPED THEREBY
Filed Sept. 1, 1964

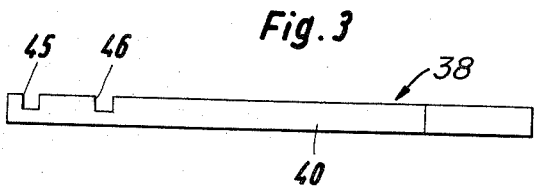
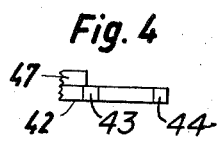
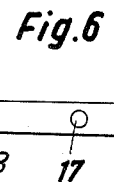
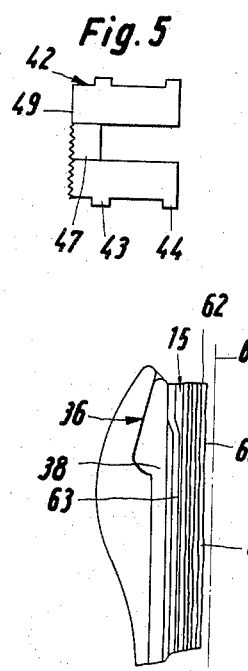
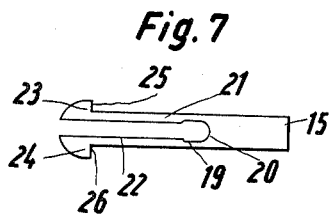
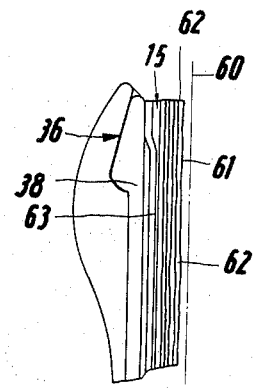

May 17, 1966  R. H. POPPER ETAL  3,251,251
GRIPPING TOOL PROVIDED WITH MEANS AUTOMATICALLY ADJUSTING THE
SIZE OF THE CLAMPING MOUTH IN CORRESPONDENCE WITH THE
CONFIGURATION OF A WORKPIECE TO BE GRIPPED THEREBY
Filed Sept. 1, 1964  4 Sheets-Sheet 4
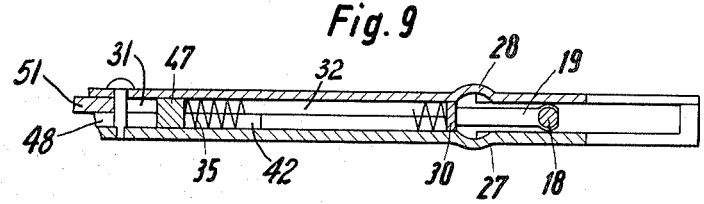
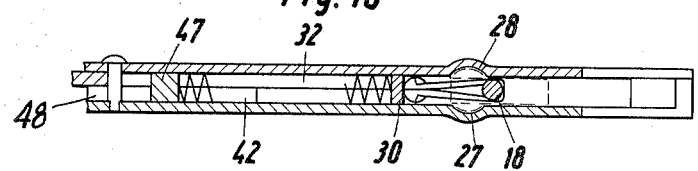
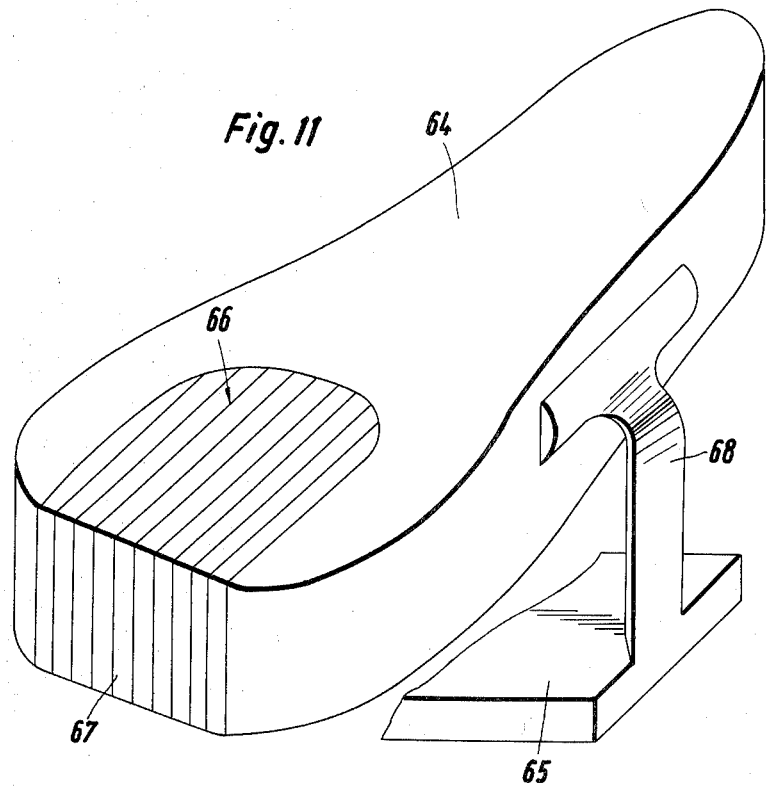

United States Patent Office 3,251,251
Patented May 17, 1966

3,251,251
GRIPPING TOOL PROVIDED WITH MEANS AUTO-
MATICALLY ADJUSTING THE SIZE OF THE
CLAMPING MOUTH IN CORRESPONDENCE
WITH THE CONFIGURATION OF A WORKPIECE
TO BE GRIPPED THEREBY
Rudolf Hans Popper, Innocentiastrasse 8, and Paul
Hirsch, Karolinenstrasse 3, both of Hamburg, Germany
Filed Sept. 1, 1964, Ser. No. 395,109
5 Claims. (Cl. 81—185)

The present invention relates to a tool for gripping work-pieces, and more particularly to a tool provided with means automatically adjusting the effective size of the clamping mouth in accordance with the size and shape of the workpiece.

In a conventional spanner the clamping mouth is un-alterably fixed and is adapted for use only with a pre-determined size of workpiece, for example a nut or a bolt head. One disadvantage of such spanner is that the fixed clamping mouth cannot compensate for nor-mal tolerances, of nuts or bolt heads so that there is often a loose gripping action.

Gripping devices such as pincers or vices or other clamping devices are also known in which the two clamp-ing jaws are relatively movable. Such pincers can be used for various workpieces, for example, for various nut sizes, but have the disadvantage that the pressure depends on the manual pressing together of the pincer grips. In addition, with this construction only two flanks on the clamping jaws are moved together so that no adap-tion to particular shapes is possible.

The same holds true for vices, which have two flat clamping jaws movable together by means of a spindle.

It is an object of the present invention to provide a tool which on insertion adapts to any shape and size, assuming that such size is within the range of sizes for which the tool is intended.

It is a further object of the present invention to provide a tool with a clamping mouth for receiving and gripping a workpiece.

A further object of the invention is to provide a tool, the clamping mouth of which is arranged to receive a workpiece and adapt itself to the shape of the workpiece for securing the workpiece in the clamping mouth.

A further object of the invention is to provide a tool having a clamping mouth which can be closed by a lever movement.

These objects are achieved according to the invention by a clamping tool having a clamping mouth formed by two fixed clamping jaws between which extends lamina-tion of parallel, elongate elements which are individually displaceable in the clamping mouth, these elements being formed as lamellae which are clampable in displaced posi-tions against the workpiece within the clamping jaws.

The elements are preferably displaceable perpendicu-larly of the opening of the clamping jaw so that the opening is formed by pressing the tool against the work-piece.

By clamping of the lamellae there is provided a clamp-ing effect, which due to the tolerance provided by and depending on the magnitude of the lamella thicknesses, ensures secure gripping, and in addition allows the tool to be employed not only as a spanner but also as a clamp-ing tool in which a workpiece can be secured.

In one advantageous embodiment the outer lamellae or elements of the lamination are guided in the clamping jaws on a clamping device, the clamping parts of which are movable towards the middle of the clamping mouth.

The lamella may be lockable against longitudinal move-ment in an initial position when at least one of the lamel-lae is shifted from its initial position by a workpiece. This is essentially to avoid reaction forces occurring in any working process leading to longitudinal movement of lamellae which are not initially locked and thereby to locking of the engagement of the adapted profiling of the clamping jaw opening.

For actuation, a preferred embodiment of the inven-tion foresees that on a housing attached to the clamping mouth an outwardly movable clamping lever is provided which in its outwardly extended position releases the clamping device and which on being swung inwards clamps the lamellae in their displaced positions. In this case, the lamellae are advantageously guided at their inner ends on a slide member displaceable against a spring force, which slide member co-operates via the spring with an extension with a rocking lever on the clamping lever, so that by means of the clamping lever it is possible to return the lamellae to their initial positions.

The invention is described below with reference to the embodiments illustrated in the drawings, in which:

FIGURE 3 is a side elevational view of one of the clamping jaws;

FIGURES 4 and 5 are, respectively, side and front elevational views of the guide part;

FIGURE 6 is a plan view of one of the middle lamella;

FIGURE 7 is a similar view of one of the other lamella;

FIGURE 8 is a fragmentary view similar to FIGURE 2, but showing a special lamella constructions;

FIGURE 9 is a cross-sectional view taken along the line IX—IX of FIGURE 2;

FIGURE 10 is similar to FIGURE 9 but illustrating a particular operating position of the lamellae; and FIGURE 11 shows a perspective view of an exemplary vice-like construction of the invention.

In the following, like parts are indicated by like refer-ence numerals.

Figure 1:
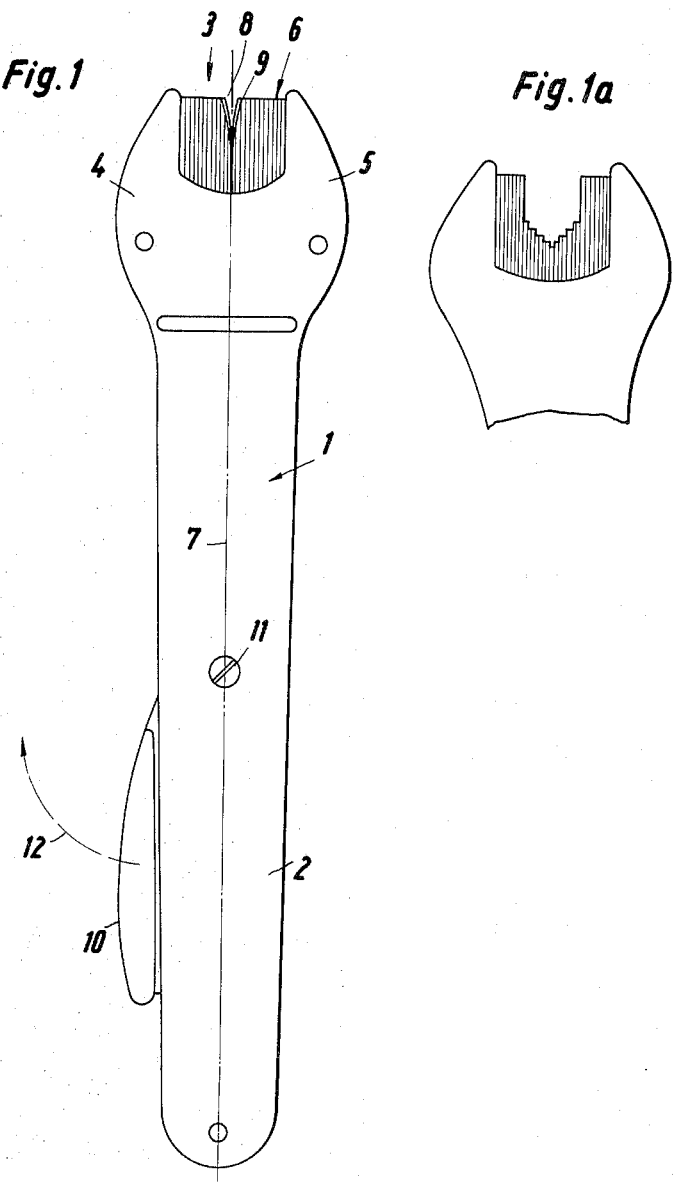
FIGURE 1 is a front elevational view of a tool em-bodying the invention and constructed as a spanner.

As shown in FIGURE 1, a spanner-like housing 1 is provided, which comprises two shells separated in the plane of the drawing and secured together by rivets. This housing has a handgrip-like part 2 and a clamping mouth 3 formed to two clamping jaws 4, 5 fixedly secured to the housing. This arrangement is similar to a spanner. The clamping mouth 3 is however filled by a lamellation of the lamella-like elements 6 which extend substantial-ly parallel to the longitudinal axis 7 of the tool. In the middle, there are arranged two curved elements 8, 9, having convex sides facing one another, which are de-scribed in more detail below. At one side of the handgrip-like part 2, there is pivoted a clamping lever 10 which is pivotable about an axis of pivotation, for example the axis of a threaded or rivet-like securing member 11 in the housing shells, in the direction of the arrow 12 to carry out certain functions.

Figure 1A:
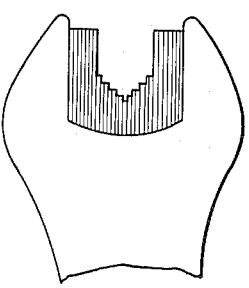
FIGURE 1a is a fragmentary, similar view of the tool showing the lamellae in operational position.

FIGURE 1a shows one configuration which may be formed by the front ends of the lamellae during actual use of the tool on a specific workpiece.

Figure 2:
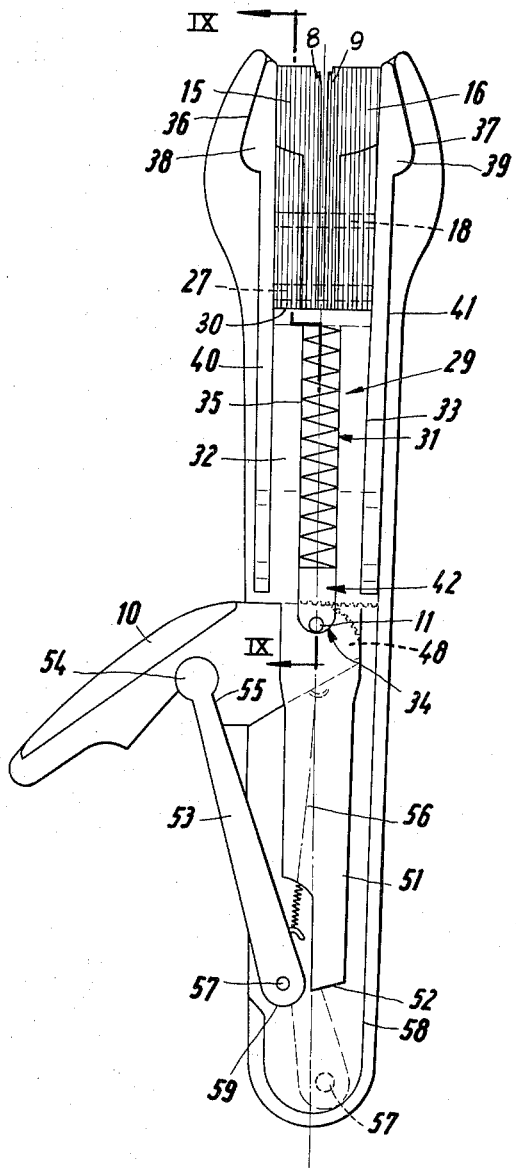
FIGURE 2 is similar to FIGURE 1 but with the upper shell removed and the clamping lever swung outwardly.

FIGURE 2 shows the tool of FIGURE 1 with the upper housing shell removed. The clamping lever 10 is shown in its outwardly pivoted position. It can be seen that the lever 10 is pivotable about the axis of the securing member 11.

The lamellae illustrated in FIGURE 2 comprise two groups. One group comprises the middle, curved lamel-lae 8, 9 with their convex sides facing one another, and the other group comprises the flat lamellae 15, 16 ar-ranged on both sides of these middle lamellae.

The lamella 8 is shown for example in FIGURE 6. It comprises a curved strip with a middle opening 17, through which extends a pin 18. Since the two lamellae 8, 9 have the same construction, the pin 18 is held substantially perpendicular to the centerline of the tool. One lamella 15 is shown for example in FIGURE 7. This lamella is provided at its innermost end with a slot 19 which at its ends has an enlargement 20 into which the pin 18 normally extends. The slot 19 is sufficiently wide to allow the pin 18 to be movable without resistance along the slot. Arms 21, 22, formed by the slot, have at their outer ends outwardly directed projections 23, 24 of arcuate shape, resulting in the shoulders 25, 26. The length of the arms are dimensioned so that, with reference to FIGURE 2, the projections 23, 24 lie with their highest points in a groove 27, which in FIGURE 2 is shown in one of the housing shells and which is associated with a corresponding groove 28 in the other housing shell, as shown for example in FIGURE 9.

When one of the lamellae 15 or 16 is shifted from the above-described position, in which its projections 23, 24 engage in the slots 27, 28, the arms 21, 22 can bend towards one another so that the projections can slide from the grooves. Since, however, for any formation in the clamping mouth the middle lamella 8, 9 are shifted, the pin 18 is moved so that it moves into the slots of the lamellae remaining in the initial position, as shown in FIGURE 2. In this way the pin 18 shifts into a position between the ends of the arms 21', 22' of the lamellae remaining in the initial position, (see FIGURE 10), and prevents these arms from moving towards one another. In this way the engagement of the projections in the associated grooves is ensured and thus also the securing of the lamellae remaining in the initial position against any shifting in the longitudinal direction of the tool.

FIGURE 2 shows that the middle lamellae 8, 9 are curved and are arranged with their convex sides facing one another. In this way there is formed between the outer ends of the lamellae an outwardly diverging slot which facilitates engagement if the tool on a workpiece and ensures at least the lamellae 8, 9 and the adjacent lamellae are secured.

The lamellae are supported at their lower ends on a slide member 29 which, in the vicinity of the lamellae, has an end 30 against which the lamellae abut. The slide member has formed therein a slot 31 defining two arms 32, 33, said slot extending from the end 30 and terminating at 34. FIGURE 2 illustrates the initial position of the slide member, wherein the end 34 of the slot is located at the axis of the fixing device 11 so that under the action of a spring 35 all of the lamellae are retained fully extended into the clamping mouth of the tool.

From the preceding description it is evident that the slide member 29 is moved downwardly as viewed in FIGURE 2, or leftwardly as viewed in FIGURE 9, when only a single lamella is pressed into the clamping mouth.

The clamping mouth, which is formed by the housing shells, has formed in the side walls thereof converging guide surfaces 36, 37 in which wedge-shaped clamping jaws 38, 39 are movable. These clamping jaws, upon operation of the tool, are pressed upwardly and toward the centerline of the tool in order to press together the lamellae 8, 9, 15 and 16. The clamping jaws 38, 39 include shafts 40, 41 which extend in the housing shells to a guide part 42 (see FIGURES 4 and 5), which guide part has lateral projections 43, 44 which fit into slots 45, 46 (see FIGURE 3), formed in the shaft 40, 41. The housing shells are profiled at their inner edge with upwardly projecting flanges so that the shafts are guided longitudinally. It can be seen that the guide part 42 is longitudinally fixed to the shafts.

The guide part 42 has an upwardly projecting block 47 which projects into the slot 31 of the slide member 29, the block advantageously being of rectangular shape and having a width such that it is non-rotatably guided in the slot 31.

Between the block 42 and the end 30 of the slide member 29 there is arranged a helical spring 35 which urges the guide part 42 and the slide member 29 together.

The clamping lever 10, which is pivotable about the axis of the connection member 11, has a cam-like projection 48 which, on swinging of the clamping lever 10 into the position shown in FIGURE 1 comes into engagement at its highest point with the lower end of the guide part 42, which surface is indicated by the numeral 49 in FIGURE 5. Desirably, the engagable portions of the surface 49 and the highest point of the projection 48, are provided with tooth-like profilings or serrations, which extend in the direction of the axis of the securing member 11. On pivoting of the clamping lever 10 in the counter-clockwise direction, the guide part 42 is displaced upwardly, whereby the spring 35 is compressed. In this way, the clamping jaws 38, 39 are simultaneously shifted along the wedge-like, converging guide surfaces 36, 37 so that the lamellae are pressed together towards the middle. Since, however, lamellae displaced in the vicinity of the longitudinal centreline 7 by pressure against a workpiece ensure that the slide member 29 is displaced, the outer lamellae remaining in their initial position are pressed inwardly and the force of the compressed spring 35 tends to lock the clamping lever 10 in the inwardly swung position, shown in FIGURE 1, by means of the serrations on the edge of the guide part 42 and on the projection 48.

The slide member 29 has extending from the section thereof in which the slot 31 is formed a projecting portion 51 which terminates at an abutment surface 52. By this it is ensured that the slide member is guided parallel to the shafts 40, 41 in the housing shells.

On the clamping lever there is pivotally arranged a rocking lever 53. The pivot pin is indicated by reference numeral 54 and has a countersupport surface 55 against which the rocking lever 53 is drawn by means of a spring 56. The rocking lever 53 has at its end an abutment 57 projecting above its plane. The rocking lever lies together with the main part of the clamping lever 10 in a plane below the projecting portion 51 of the slide member 29, while the abutment 57 projects to the height of the projecting portion 51. When the slide member 29 is in the position shown in FIGURE 2, wherein the clamping lever 10 is pivoted outwardly of the housing, the abutment 57 is lowered from the abutment surface 52 of the projecting portion 51. This action is effected by the countersupport surface 55 acting upon the upper portion of the rocking lever 53 and the tension of the spring 56. It is to be noted that the clamping lever 10 and its cam-like projection 48 are positioned in a plane below that of the slide member 29, which slide member includes the arms 32, 33 and the projecting portion 51 (see also FIGURES 9 and 10). If, now, pressure is applied to the upper ends of the lamellae, such lamellae will displace the slide member downwardly so that the slot 31 extends down below the pivot pin 11. Now, when the clamping lever 10 is pivoted in a clockwise direction (to the position as shown in FIGURE 1), the cam-like projection 48 acts upon the guide part 42 and urges the latter upwardly. At the same time, the abutment 57 slides downwardly along the lower edge of the projecting portion 51 until it reaches the lower position indicated by the dotted lines. Since the guide part 42 is mechanically coupled to the shafts 41, 42, the upward movement of the guide part causes the clamping jaws to move along the converging guide surfaces 36, 37, thereby pressing the lamellae inwardly and exerting a pressure on a workpiece inserted into the clamping mouth of the tool.

To disengage the tool from the workpiece, the clamping lever 10 is returned to the position shown in FIG- URE 2. The spring 35 urges the guide part 42 downwardly so that the clamping jaws are returned to the illustrated positions, thereby relieving the side pressure exerted upon the lamellae. During such return movement, the abutment 57 engages the abutment surface 52 and pushes the slide member 29 upwardly, whereby the lamellae are returned to their initial positions. With the workpiece removed, the clamping lever can be returned to the position shown in FIGURE 1, which action merely causes the lamellae to be pressed together.

It is pointed out that the projecting portion 51 has a length such that the abutment 57 is first freed from the abutment surface 52 when the slide member 29 is located in its upper position. The abutment 57 is located in a lateral extension of the rocking lever 53 in the plane of the drawing, FIGURE 2. The rocking lever 53 has a width such that edge 59 thereof extends to the wall 58 of the lower housing shell when the clamping lever 10 is rotated counterclockwise to the fullest extent. This assures the abutment 57 coming into engagement with the abutment surface 52 before the clamping lever has been pivoted in a counterclockwise direction to an extent such that the counterabutment surface 55 comes into engagement with the rocking lever 53 in order to rotate the lower end of the rocking lever in a clockwise direction. Such movement of the rocking lever is opposed by the spring 56 as long as the counterabutment surface 55 does not come into contact with the rocking lever. Before such contact is established between the counterabutment surface 55 and the rocking lever, the spring 56 retains the lower end of the rocking lever in engagement with the wall 58, thereby to assure engagement of the abutment 57 with the abutment surface 52.

In this way the following functions are produced with reference to FIGURE 2:

Assuming firstly that the clamping lever 10 is swung against the hand grip, i.e. against the housing 2 as shown in FIGURE 1. In this position, the guide part 42 is pressed upwardly by the projection 48. The shoulders 25, 26 (see FIGURE 9), fixedly urged the lamellae 15, 16 into their upper position within the grooves 27, 28. In this position the clamping jaws 38, 39 are also located in their inwardly pressed positions.

Before the tool is adjusted, the clamping lever 10 is swung into the upward position shown in FIGURE 2, whereby the countersupport surface 55 raises the abutment 57 from the abutment surface 52. If the lamellae are now pressed against a workpiece, the inner lamellae are for example pressed downwardly. Due ot the inclined ends of the projections 23, 24, the inner lamellae slide from the groves 27, 28 and press the slide member 29 downwardly with reference to FIGURE 2. The guide part 42 can then move according to the size of the spring, even when it is held by a head surface of the clamping lever 10.

With the middle lamellae in their inwardly-pressed positions, the clamping lever 10 is now swung back into the position shown in FIGURE 1. The projection 48 then presses the guide part 42 upwardly with reference to FIGURE 2, so that the clamping jaws 38, 39 slide upwardly along the guide surfaces 36, 37 and in accordance with the wedge inclination move inwardly to press the outer lamellae remaining in their initial position (FIGURE 1a) inwardly against an inserted workpiece. A locking action is produced between the serrations on the cam projection 48 and the lower end of the guide part 42. In this position the spring 35, due to the return of the slide member 29, is compressed by at least the middle lamella and the slide member is located in a position shifted downwardly with reference to FIGURE 2 or to the left with reference to FIGURE 10. The rocking lever lies with its abutment 57 in the position shown in broken lines in FIGURE 2, in which it is held by the spring 56. The tool is locked in this position, whereby the downward displacement of the locking pin 18 with reference to FIGURE 1 is also prevented but the outer lamellae remaining in their initial positions slide out of the grooves 27, 28.

The tool can be used for example in this condition as a spanner, when, for example, no workpiece is gripped by the inward movement of the counter support parts.

If the tool is to be brought back into the initial position, and the workpiece subsequently moved out from the clamping mouth, the clamping lever 10 is swung back to the position shown in FIGURE 2. The lower end, with reference to FIGURE 2, of the rocking lever 53 moves upwardly on the edge portion 58, against which it is held by the spring 56. The abutment 57 therefore moves against the abutment surface 52 and pushes the slide member 29 upwardly so that the lamellae are drawn back into their initial positions. Simultaneously, due to the opposed swinging of the cam projection 48, the guide part 42 is released, so that under the action of the spring 35 the clamping jaws 38, 39 move downwardly in their guide surfaces 36, 37 so that the lamellae are also released from the clamping forces previously acting laterally downwardly.

It can be seen that an opposed action by the compressed spring 35 is ensured, since by return movement of the clamping jaws 38, 39, the lamellae are able to move and such movement is ensured simultaneously, or with a certain delay by corresponding dimensioning of the linkage, by engagement of the abutment 57 against the abutment surface 52. When the lamellae are in their initial position, the clamping lever 10 can again be swung into the position shown in FIGURE 1 and the lamellae are then inwardly clamped by reason of the bowed configuration of the lamellae 8 and 9.

Before using the tool, the lever 10 is again swung into the position shown in FIGURE 2 so that the clamping jaws 38, 39 are brought into their inwardly displaced positions in which the lamellae can be pressed inwardly of the tool.

FIGURE 8 shows a partial view with a clamping mouth comprising, for example, the guide surface 36 along which the clamping jaw 38 is guided. The lamella group 15 is arranged at this countersupport part. Apart from the fact that all lamellae of this lamella group are provided in the middle (the centre line is indicated by reference to numeral 60) with a transversely extending profiling 61, 62 etc., the outer lamella in front of the countersupport part is curved as shown by the line 63, so that a sprung element is thus included. In this way, the inner lamellae are all resiliently urged towards the middle, so that a resilient engagement can be obtained. The springiness of the lamella 63 can be related to the wedge inclination of the cam projection 48 (see FIGURE 2) so that even with the greatest possible displacement of the clamping jaws there remains some resiliency so that resilient engagement is obtained.

The parts which are not supported on pivot pins or the like are movably guided by corresponding profiling in the housing or on the housing walls and on adjacent elements. The lamellae themselves are secured against a complete removal from the mouth by the profilings 23 to 26 which engage in the associated counter profiling.

FIGURE 11 shows a vice-like housing 64 which has a fixing device 65 of usual kind for application against a work table. The housing 64 has for example a horizontally arranged clamping mouth 66, in which lamellae 67 of the above-described type are arranged. From the housing 64, a clamping lever 68 is pivotal to hold an inserted workpiece in the clamping mouth as described above. It is to be understood that the clamping mouth can also be arranged in a vertical plane, and it is also to be understood that such a clamping mouth can be constructed with extra thin elements, for example of the order of 0.2 mm. thickness, for extremely close adaption to a particular workpiece shape.

The invention not only provides a novel tool but also by the above-described construction provides a surprisingly simple arrangement and construction for the actuating elements which, occupying the smallest possible space, ensure a secure operation.

We claim:

1. A tool for gripping workpieces, comprising a housing formed with side walls and an upper and a lower wall, said upper and lower walls being recessed at one end of the housing, two fixed jaws provided on the housing and forming a mouth opening at the recessed end of said housing, a plurality of lamellae arranged in parallel relation to and stacked between said side walls with an outer portion positioned between said fixed jaws and with an inner portion extending into said housing, said lamellae being individually displaceable out of a first position into another position, a clamping device disposed between the outermost lamellae of said lamella stack and including wedge-shaped clamping jaws guided along said fixed jaws and acting upon the outer lamellae portions disposed between said fixed jaws so as to urge these lamellae portions inwardly, said clamping device comprising further connecting means disposed between said wedge-shaped clamping jaws and a guide part supported within said housing for movement in a direction toward said lamellae, a slide member guided in said housing and movable in a direction toward said lamellae and including a first end portion supporting said lamellae, a second end portion and a slot-like opening extending from said first end portion and terminating in spaced relation thereto, said guide part including a projection disposed in the said slot-like opening, a pressure spring disposed between said guide part and said first end portion, a pivot pin arranged between said upper and said lower housing wall, means forming a slot-like aperture in one side wall of said housing disposed adjacent said pivot pin and extending from the end of said housing in a direction away from said clamping mouth, a clamping lever pivotally supported on said pivot pin and movable into a first position angularly away from said housing and into a second position adjacent said housing, said clamping lever including a cam projection extending eccentrically relative to said pivot pin and engaging the projection of said guide part in such a manner that the guide part, when said clamping lever is moved into said first position is urged by said pressure spring into a position remote from said mouth opening and into a predetermined position relative to said mouth opening when said clamping lever is moved into its second position, the said connecting means moving said clamping jaws into said mouth opening to press said lamellae against each other, while said spring moves the said first end portion of the slide member to advance said lamellae toward said mouth opening.

2. A tool according to claim 1, in which a rocker lever disposed in the path of movement of said clamping lever is drivingly connected thereto for a limited pivotal movement, said clamping lever including a counter support surface taken along said rocker lever laterally during the final portion of the upward movement of said clamping lever, said rocker lever being engaged by a second spring tending to pull said rocker lever against said counter support surface, and in which said second end portion includes an abutment surface and a projection being arranged on said clamping lever at the end remote of said rocker lever, the arrangement being such that said projection engages said abutment surface when said slide member occupies the position remote of said mouth opening, so that said slide member with its first end portion is pushed forwardly by said first spring upon outwardly pivoting said clamping lever, so as to move said lamellae into their forward position, in which said first spring at the same time causes a return movement of said guide part away from said mouth opening.

3. A tool according to claim 1, in which said fixed jaws include inner guide surfaces extending obliquely relative to the direction of displacement of said lamellae and converging toward the ends of said fixed jaws so as to move said wedge-shaped clamping jaws with respect to the center line of the housing towards each other when they are moved forwardly.

4. A tool according to claim 1, in which the inner portions of said lamellae are provided with longitudinal slots except said middle lamellae which are provided with openings aligned with the end zones of such slots of the other lamellae when said lamellae are aligned, a pin arranged in said openings and extending into the slots of the adjacent lamellae, which pin is movable along said slots when said middle lamellae slide into said mouth opening, said slots having a width corresponding substantially to the diameter of said pin, said lamellae having arms laterally defining said slots and including at their ends outwardly directed projections, and in which a conical recess is provided in each of the upper and lower walls of said housing into which recesses the said projections fall when said lamellae ocupy the said one position.

5. A tool according to claim 1, in which said middle lamellae are curved in such a manner that the convex sides of these lamellae are facing each other.

References Cited by the Examiner
UNITED STATES PATENTS 172,239  1/1876  Barlow _____ 81—129

FOREIGN PATENTS 1,160,259  2/1958  France.
315,926  11/1919  Germany.

WILLIAM FELDMAN, *Primary Examiner.*

MILTON S. MEHR, *Examiner.*